(12) United States Patent
Vasudevan

(10) Patent No.: US 7,300,506 B2
(45) Date of Patent: Nov. 27, 2007

(54) INK FORMULATIONS, PRINT SYSTEMS, AND METHODS THEREOF

(75) Inventor: Sundar Vasudevan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 227 days.

(21) Appl. No.: 11/082,680

(22) Filed: Mar. 17, 2005

(65) Prior Publication Data

US 2006/0207473 A1   Sep. 21, 2006

(51) Int. Cl.
*C09D 11/00* (2006.01)
(52) U.S. Cl. ............... 106/31.6; 106/31.65; 106/31.75
(58) Field of Classification Search ............... 106/31.6, 106/31.75, 31.65
See application file for complete search history.

(56) References Cited

U.S. PATENT DOCUMENTS

| | | | |
|---|---|---|---|
| 5,700,315 A * | 12/1997 | Wenzel | 106/31.58 |
| 5,846,682 A * | 12/1998 | Murofushi et al. | 430/108.2 |
| 5,981,623 A * | 11/1999 | McCain et al. | 523/160 |
| 6,682,591 B2 * | 1/2004 | Smith et al. | 106/31.58 |
| 6,867,286 B1 * | 3/2005 | Holloway et al. | 534/797 |
| 6,926,766 B2 * | 8/2005 | Pistagna et al. | 106/31.59 |
| 2005/0005817 A1 | 1/2005 | Kusakata et al. | |
| 2005/0204954 A1 * | 9/2005 | Pistagna et al. | 106/31.59 |
| 2006/0109323 A1 * | 5/2006 | Pallen et al. | 347/100 |

FOREIGN PATENT DOCUMENTS

EP   1 457 533 A1   9/2004

\* cited by examiner

*Primary Examiner*—Helene Klemanski

(57) ABSTRACT

Ink formulations, ink jet sets, methods of stabilizing an ink formulation, printer systems, and methods thereof, are disclosed. One exemplary ink formulation, among others, includes a pigment and a borate buffer. The ink formulation has an ink stability characteristic of a pH drift of less than 1.0 pH over a one year time period. The ink formulation has a size stability characteristic of a diameter of the pigment increasing less than 20% over a one year time period.

13 Claims, 1 Drawing Sheet

INK FORMULATIONS, PRINT SYSTEMS, AND METHODS THEREOF

BACKGROUND

The pH of pigment based inks tends to drift over time. This is an ongoing problem. Typically pigments are dispersed using polymeric dispersants that carry charges on carboxylate groups. These charges repel each other, keeping the pigment particles stabilized in dispersion. This is called electrostatic stabilization. The other way pigments are stabilized is by steric stabilization, but the former is more important to stability of pigment dispersions, and hence preferred. However, the pH of such dispersions tends to drift over prolonged storage.

When the pH drop occurs, the carboxylate groups get protonated and the total charge needed to stabilize the pigment dispersion decreases. When this decreases enough, the pigment dispersions will flocculate and crash. This flocculation can cause nozzle clogging and potentially pen failure. The drop in pH can be accelerated by storing the ink at an elevated temperature (e.g., 70° C.).

Prior solutions have included making the ink at a higher pH than necessary to keep the pigment particles dispersed. This is expected to allow for the drop in pH. However compatibility of pen materials with a high pH ink can be a potential problem.

Another approach is for the end user to shake the ink cartridge before installing in the printer, while another approach is to reduce the labeled useful lifetime of the pigment based inks.

Another approach has been to add a large amount of dispersant polymer. This could lead to several problems, such as expense and increased viscosity, where the latter can cause problems with ink jet pen performance.

Accordingly, it would be advantageous to have a rational approach to polymer design for preparing stable ink dispersions.

SUMMARY

Briefly described, embodiments of this disclosure include ink formulations, ink sets, methods of stabilizing an ink formulation, printer systems, and methods related thereto.

One exemplary ink formulation, among others, includes a pigment and a borate buffer. The ink formulation has an ink stability characteristic having a pH drift of less than 1.0 pH over a one year time period. The ink formulation has a size stability characteristic, where a first diameter of the pigment increases less than 20% of first diameter over a one year time period when stored at 23° C.

One exemplary ink set, among others, includes: a pigment-based ink formulation; and a borate buffer, wherein the ink formulation has an ink stability characteristic having a pH drift of less than 1.0 pH over a one year time period, and wherein the ink formulation has a size stability characteristic where a first diameter of the pigment increases less than 20% of first diameter over a one year time period.

One exemplary method of stabilizing an ink formulation, among others, includes: mixing a pigment with a buffer, the buffer causing the ink formulation to have an ink stability characteristic of a pH drift of less than 1.0 pH over a one year time period, and the buffer causing the ink formulation to have a size stability characteristic of a diameter of the pigment increasing less than 20% over a one year time period.

An exemplary printer system, among others, includes a dispensing system including at least one printhead. The printhead includes an ink formulation that includes a pigment and a borate buffer, the ink formulation having an ink stability characteristic oh a pH drift of less than 1.0 pH over a one year time period, and the ink formulation having a size stability characteristic of a diameter of the pigment increasing less than 20% over a one year time period.

BRIEF DESCRIPTION OF THE DRAWING

Many aspects of this disclosure can be better understood with reference to the following drawing. The components in the drawing are not necessarily to scale.

DETAILED DESCRIPTION

Figure 1:
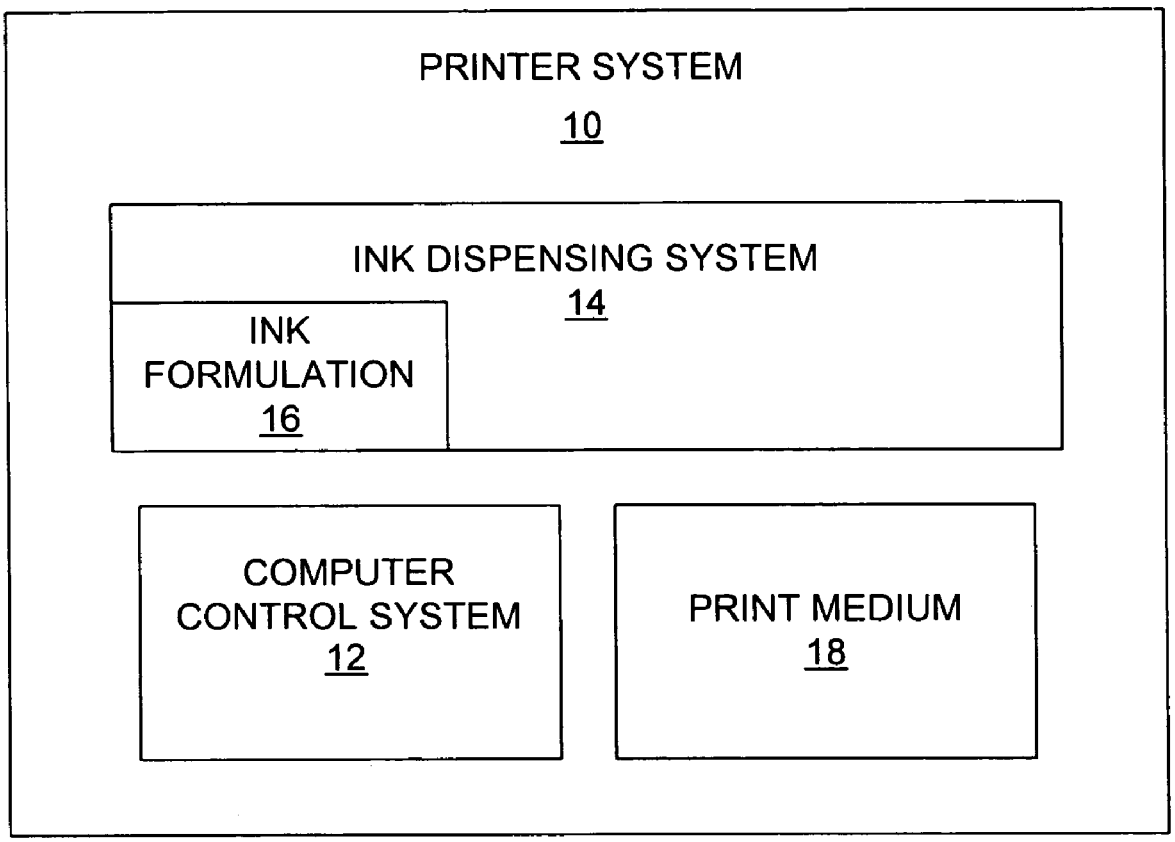
FIG. 1 illustrates an embodiment of a disclosed printer system.

Ink formulations, printer systems, and methods thereof, are described. Embodiments of the present disclosure include ink formulations including a pigment and at least one buffer (e.g., a borate buffer). Embodiments of the present disclosure substantially increase the pH stability of pigment formulations without adversely affecting particle size stability. Although not intending to be bound by any theory, the pH stability characteristic of the ink formulation does not substantially drift over at least a one year time period, while the particle size characteristic (e.g., particle size of the pigment prior to introduction to the borate buffer) does not substantially increase over at least a one year time period.

FIG. 1 illustrates a block diagram of a representative printer system 10 that includes, but is not limited to, a computer control system 12, an ink dispensing system 14, and a print medium 18, all disposed near each other. The computer control system 12 includes a process control system that is configured to control the ink dispensing system 14. In particular, the computer control system 12 instructs and controls the ink dispensing system 14 to print characters, symbols, photos, etc. onto the print medium 18.

The ink dispensing system 14 includes, but is not limited to, an ink formulation 16. In addition, the ink dispensing system 14 includes ink-jet technologies and coating technologies, which dispense the ink formulation 16 (e.g., pigment-based ink formulations) onto the print medium 18. Ink-jet technology, such as drop-on-demand and continuous flow ink-jet technologies, can be used to dispense the ink formulation 16. The ink dispensing system 14 can include at least one ink-jet printhead system (e.g., thermal ink-jet printhead and/or a piezo ink-jet print head) operative to dispense (e.g., jet) the ink formulation 16 through one or more of a plurality of nozzles in a printhead. The printhead system incorporates an array of firing chambers that receive the ink formulation 16, which is in fluid communication with one or more ink reservoirs (not shown).

The term "print media" or "print medium" can include, but is not limited to, a paper substrate, a photobase substrate, a plastic media (e.g., clear to opaque plastic film) substrate, and the like. The print media can include, but is not limited to, a hard or flexible material made from a polymer, a paper, a glass, a ceramic, a woven cloth, or a non-woven cloth material.

The ink formulation 16 includes, but is not limited to, a pigment and a buffer. The ink formulation 16 has an ink stability characteristic having a pH drift of: less than 1.0, less than 0.8, less than 0.5, less than 0.3, less than 0.2, from about 0.2 to 1.0, about 0.2 to 0.8, about 0.2 to 0.5, and about 0.2 to 0.3. The time frame for the pH drift is over a one year time period, over a one and a half year time period, over a two year time period, from about a one year time period to a one and a half year time period, and from about a one year time period to a two year time period. In addition, the ink formulation has a size stability characteristic where a first diameter of the pigment (prior to introduction to the buffer) increases less than 20% of first diameter over a one year time period, over a one and a half year time period, over a two year time period, from about a one year time period to a one and a half year time period, and about a one year time period to a two year time period. In other words, a second diameter of the pigment, as determined after a certain time period of being exposed to the buffer, is not greater than 120% of the first diameter.

The buffer can include compounds such as those made up of cations having an empty frontier orbital energy (as defined by Klopman, G. J. Am. Chem. Soc. 1968, vol 90, 223, which is incorporated herein by reference) of less than 2.0 eV to −10 eV, about 1.5 eV to 8 eV, and about 1.0 eV to 5 eV. In addition, the buffer can include compound that an empty frontier orbitol energy of about 1 eV to −5 eV.

The buffer can include compounds such as those having a pKa of about 5.5 to 11.0, about 6.0 to 10.0, about 7.5 to 9.5 and about 7.0 to 9.5.

In particular, the buffer is a borate buffer. The borate buffer includes, but is not limited to, sodium borate, potassium borate, lithium borate, ammonium borate, and combinations thereof. In addition, the borate buffer includes, but is not limited to, triethanolamine borate, diethanolamine borate, ethanolamine borate, and combinations thereof. Furthermore, the borate buffer includes, but is not limited to, tetramethylammonium borate, The ink formulation 16 can include an amount of pigment from about 0.1 to 10 weight percent of the ink formulation, about 0.1 to 5 weight percent of the ink formulation, and about 1 to 5 weight percent of the ink formulation.

The ink formulation 16 can include an amount of buffer from about 0.05 to 8 weight percent of the ink formulation, about 0.05 to 5 weight percent of the ink formulation, and about 0.1 to 3.5 weight percent of the ink formulation.

The pigment of the ink formulation 16 can include, but is not limited to, a black pigment and a color pigment. In general, the diameter of the pigment can range from 10 nm to 300 nm.

The following black pigments can be used in the practice of this disclosure; however, this listing is merely illustrative and not intended to limit the disclosure. The following black pigments are available from Cabot: Monarch™ 1400, Monarch™ 1300, Monarch™ 1100, Monarch™ 1000, Monarch™ 900, Monarch™ 880, Monarch™ 800, and Monarch™ 700, Cab-O-Jet™ 200, Cab-O-Jet™ 300, Black Pearls™ 2000, Black Pearls™ 1400, Black Pearls™ 1300, Black Pearls™ 1100, Black Pearls™ 1000, Black Pearls™ 900, Black Pearls™ 880, Black Pearls™ 800, Black Pearls™ 700; the following are available from Columbian: Raven 7000, Raven 5750, Raven 5250, Raven 5000, and Raven 3500; the following are available from Degussa: Color Black FW 200, Color Black FW 2, Color Black FW 2V, Color Black FW 1, Color Black FW 18, Color Black S 160, Color Black FW S 170, Special Black 6, Special Black 5, Special Black 4A, Special Black 4, Printex U, Printex 140U, Printex V, and Printex 140V Tipure™; and R-101 is available from DuPont.

The pigment may also be chosen from a wide range of conventional colored pigments. For the purposes of clarification only, and not for limitation, some exemplary colorants suitable for this purpose are set forth below Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyanthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), (PV19 is a quinacridone) Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138.

Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982).

Other examples of pigments include Hostafine series such as Hostafine™ Yellow GR (Pigment 13), Hostafine™ Yellow (Pigment 83), Hostafine™ Red FRLL (Pigment Red 9), Hostafine™ Rubine F6B (Pigment 184), Hostafine™ Blue 2G (Pigment Blue 15:3), Hostafine™ Black T (Pigment Black 7), and Hostafine™ Black TS (Pigment Black 7), available from Hoechst Celanese Corporation, Normandy Magenta RD-2400 (Paul Uhlich), Paliogen Violet 5100 (BASF), Paliogen™ Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen™ Blue L6900, L7020 (BASF), Heliogen™ Blue D6840, D7080 (BASF), Sudan Blue OS (BASF), PV Fast Blue B2GO1 (American Hoechst), Irgalite Blue BCA (Ciba-Geigy), Paliogen™ Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen™ Orange 3040 (BASF), Ortho Orange OR 2673 (Paul Uhlich), Paliogen™ Yellow 152, 1560 (BASF), Lithol Fast Yellow 0991 K (BASF), Paliotol Yellow 1840 (BASF), Novoperm™ Yellow FG 1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm™ Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen™ Red 3871 K (BASF), Paliogen™ Red 3340 (BASF), and Lithol Fast Scarlet L4300 (BASF).

In addition, the ink formulation 16 can include, but is not limited to, surface-active compounds, solvents, aqueous solution salts, biocides, binders, viscosity modifiers, and combinations thereof.

The surface-active compound can include, but is not limited to, propoxylated fatty acids, propoxylated alchohols, ethoxylated fatty acids, ethoxylated alcohols, alkyl phenols, and combinations thereof. In particular, the surface-active compound can include Antarox™ AA-60, Antorox™ L62, Alcodet™ IL-3500, Antorox™ BL, Antarox™ LA-EP, and Antarox™ LF-224, all of which can be purchased from Rhone-Poulenc Inc.

The solvent can include, but is not limited to, water soluble organic solvents. The water soluble organic solvents can include, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones.

For example, the solvent can include, but is not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides.

In particular, the solvent can include, but is not limited to, ethoxylated glycerol, 2-methyl-1,3-propanediol; 2-methyl-2,4-pentanediol; 1,5-pentanediol; 2-pyrrolidone; 1-(2-hydroxylethyl)-2-pyrrolidinone; 2-ethyl-2-hydroxymethyl-1,3-propanediol; diethylene glycol; 3-methoxybutanol; and 1,3-dimethyl-2-imidazolidinone. The solvent can also include, but is not limited to, 1,2-hexanediol; 1,2-octanediol; 2,5-dimethyl-3-hexyne-2,5-diol; 3-hexyne-2,5-diol; sulfolane; 3-pyridyl carbinol; and other pyridine derivatives. In addition, the solvents can be added to reduce the rate of evaporation of water in the ink-jet to minimize clogging or adjust other properties of the ink such as viscosity, pH, surface tension, optical density, and print quality.

The salt can include, but is not limited to, ammonium, potassium, or lithium benzoate salts; ammonium, potassium, or lithium acetates; ammonium, potassium, or lithium xylene sulfonate salts; nitrates of $NH_4$, sodium, lithium, and potassium; lactates of ammonium, potassium, or lithium; citrates of ammonium, potassium, or lithium; carbonates of sodium, lithium, and potassium; diphosphates of sodium, lithium, and potassium; triphosphates of sodium, lithium, and potassium; and mixtures thereof. In addition, the salt can include sodium, lithium, and potassium salts of compounds such as, but not limited to, citrate, succinate, lactate, formate, gluconate, tartrate, malonate, fumarate, malate, sebacate, laurate, glutarate, acetate, oxalate, adipate, pimelate, suberate, azelate, and mixtures thereof.

Various biocides can be used to inhibit growth of undesirable microorganisms. The biocides can include, but are not limited to, benzoate salts, sorbate salts, commercial products such as NUOSEPT™ (Nudex, Inc., a division of Huls America), UCARCIDE™ (Union Carbide), VANCIDE™ (RT Vanderbilt Co.), and PROXEL™ (ICI Americas), and other biocides.

Various surfactants can be used in the ink formulation 16. The surfactant can include, but are not limited to, anionic, non-ionic, and zwitterionic surfactants. The anionic surfactant can include, but is not limited to, sodium or potassium salts of straight chain fatty acids; sodium and potassium salts of coconut oil fatty acids; sodium and potassium salts of tall oil fatty acids; amine salts; acylated polypeptides; linear alkyl benzene sulfonates; higher alkyl benzene sulfonates; benzene; toulene; xylene; cumenesulfonate; lignosulfonates; petroleum sulfonates; N-acyl-n-alkyltaurates; paraffin sulfonates; secondary n-alkanesulfonates; alpha olefin sufonates; sulfosuccinic esters; alkyl naphthalene sulfonates; isoethionates; sulfuric acid ester salts; sulfated polyoxyethylenated straight-chain alcohols; sulfated triglycerides oils; phosphoric and polyphosphoric acid esters; and perfluorinated anionic surfactants.

The non-ionic surfactant can include, but is not limited to, alkylphenol ethoxylates, polyoxyethylenates, straight chain alcohol ethoxylates, polyoxyethylenated polyoxypropylene glycols, polyoxyethylenated mercaptans, long chain carboxylic acid esters, glyceryl and polyglyceryl esters of natural and fatty acids, propylene glycol, sorbitol and polyoxyethylenated sorbitol esters, polyoxyethylene glycol esters and polyoxyethylenated fatty acids, aklanolamine condensates, alkanolamides, tertiary acetylenic glycols, polyoxyethylenated silicones, N-alkylpyrrolidones, and alkylpolyglycosides.

The zwitterionic surfactant can include, but is not limited to, beta-N-alkylaminopropionic acids, N-alkyl-beta-iminodipropionic acids, imidazoline carboxylates, N-alkylbetaines, amine oxides, sulfobetaines, and surfactants.

In addition, binders can be included in the ink formulation, which act to secure the ink on the print medium. The binders can include, but are not limited to, compounds having molecular weight (MW) of from about 200 MW to about 10000 MW. The binders can include, but are not limited to, polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

The ink formulation 16 can be used in conjunction with one or more inks in an ink-jet ink set having one or more ink formulations in a printer system 10. For example, the ink set can include the ink formulation 16 and a second ink formulation. In other embodiments, the ink set can include the ink formulation 16 and a plurality of ink formulations. The ink formulation 16 and the one or more inks can be used in the same printhead or in one or more printheads.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

EXAMPLES

The Tables below summarize the results of several experiments. Typically, inks were made in vehicle 1 or vehicle 2 using either self-dispersed or conventionally dispersed pigment dispersions as colorants. The inks were stored at about 70° C. and their pH and particle sizes were measured weekly. An increase in particle size of 20% or more is considered failure. The values listed are as follows: ΔpH is the overall drop in pH of the ink over the six week period the test is run. PS % change refers to the change in particle size (measured using the MicroTrac particle size analyzer from Particle Sizing Systems) relative to the corresponding size at the beginning of the test. It can be seen that in each and every case the buffer mitigates the drop in pH.

Inks made with self-dispersed pigment dispersions in vehicle 1.

| Ink | ΔpH | PS % Change |
|---|---|---|
| Cyan | | |
| Control 1 | 1.09 | −12.48 |
| NaB, pH 9.2 | 0.40 | −9.13 |
| KB, pH 9.2 | 0.43 | −4.95 |
| LiB, pH 9.2 | 0.51 | −6.21 |
| AmmB, pH 9.2 | 0.24 | −4.89 |
| TMAB, pH 9.2 | 0.47 | −2.87 |
| NaB, pH 8.5 | 0.11 | 2.27 |
| KB, pH 8.5 | 0.24 | 0.21 |
| LiB, pH 8.5 | 0.12 | −2.76 |
| AmmB, pH 8.5 | 0.18 | 0.22 |
| TMAB, pH 8.5 | 0.15 | 4.22 |
| Tricine, pH 8.5 | 0.09 | −0.27 |
| Magenta | | |
| Control 1 | 1.23 | 11.81 |
| NaB, pH 9.2 | 0.4 | −9.67 |
| KB, pH 9.2 | 0.41 | 9.80 |
| LiB, pH 9.2 | 0.4 | 4.50 |
| AmmB, pH 9.2 | 1.47 | 8.33 |
| TMAB, pH 9.2 | 0.52 | 2.68 |
| TEAB, pH 9.2 | 0.03 | −5.70 |
| NaB, pH 8.5 | 0.25 | −7.69 |
| KB, pH 8.5 | 0.34 | −5.50 |
| LiB, pH 8.5 | 0.33 | −0.08 |
| AmmB, pH 8.5 | 0.3 | 2.55 |
| TMAB, pH 8.5 | 0.33 | −9.45 |
| TEAB, pH 8.5 | 0.08 | 4.50 |
| Yellow | | |
| Control 1 | 0.76 | 7.89 |
| NaB, pH 9.2 | 0.4 | −2.30 |
| KB, pH 9.2 | 0.41 | −0.57 |
| LiB, pH 9.2 | 0.44 | 1.78 |
| AmmB, pH 9.2 | 0.11 | 2.25 |
| TMAB, pH 9.2 | 0.48 | 3.12 |
| TEAB, pH 9.2 | 0.19 | 2.46 |
| NaB, pH 8.5 | 0.16 | −2.50 |
| KB, pH 8.5 | 0.18 | −0.10 |
| LiB, pH 8.5 | 0.14 | 3.62 |
| AmmB, pH 8.5 | 0.15 | 5.48 |
| TMAB, pH 8.5 | 0.18 | −0.19 |
| TEAB, pH 8.5 | 0.14 | 7.62 |

Inks made with conventionally dispersed pigment dispersions in the same vehicle 1 or another vehicle 2.

| Ink | ΔpH | PS % Change |
|---|---|---|
| Cyan | | |
| Control 1 | 0.59 | 7.14 |
| TEAB, pH 9.2 | 0.15 | −2.03 |
| DEAB, 9.2 | 0.09 | 12.65 |
| DEAB, 8.5 | 0.08 | 20.74 |
| EAB, 9.2 | 0.32 | 6.76 |
| EAB, 8.5 | 0.16 | 17.36 |
| Control 2 | 0.57 | −4.97 |
| TEAB, 9.2 | 0.09 | −0.55 |
| TEAB, 8.5 | 0.05 | −1.12 |
| DEAB, 9.2 | 0.13 | −2.15 |
| DEAB, 8.5 | 0.06 | 0.35 |

Inks made with different conventionally dispersed yellow dispersions in the same vehicle 1.

| Ink | ΔpH | PS % Change |
|---|---|---|
| Yellow | | |
| Control 1 | 0.59 | 34.09 |
| TEAB, pH 9.2 | 0.18 | 2.79 |
| Control 2 | 0.84 | 0.08 |
| TEAB, pH 9.2 | 0.29 | −4.22 |
| Control 3 | 0.82 | −3.69 |
| TEAB, pH 9.2 | 0.24 | −5.41 |
| Control 4 | 0.82 | −1.42 |
| TEAB, pH 9.2 | 0.2 | −0.67 |

Abbreviations: NaB=sodium borate; KB=potassium borate; LiB=lithium borate; AmmB=ammonium borate; TMAB=tetramethylammonium borate; TEAB=triethanolamine borate; DMAB=dimethanolamine borate and EAB=ethanolamine borate.

Many variations and modifications may be made to the above-described embodiments. All such modifications and variations are intended to be included herein within the scope of this disclosure and protected by the following claims.

The invention claimed is:

1. An ink formulation, comprising:
    a pigment; and
    a borate buffer, wherein the ink formulation has an ink stability characteristic such that pH of the ink drifts less than 1.0 pH over a one year time period, wherein the borate buffer is selected from at least one of: potassium borate, lithium borate, ammonium borate, tetramethylammonium borate, triethanolamine borate, diethanolamine borate, ethanolamine borate, and combinations thereof.

2. The ink formulation of claim 1, wherein the ink formulation has an ink stability characteristic such that pH of the ink drifts less than 0.5 pH over a one year time period.

3. The ink formulation of claim 1, wherein the ink formulation has an ink stability characteristic such that pH of the ink drifts less than 0.2 pH over a one year time period.

4. An ink formulation, comprising:
    a pigment; and
    a borate buffer, wherein the ink formulation has a size stability characteristic such that a diameter of the pigment increases less than 20% over a one year time period when stored at 23° C., wherein the borate buffer is selected from triethanolamine borate, diethanolamine borate, ethanolamine borate, and combinations thereof.

5. The ink formulation of claim 4, wherein the borate buffer has an empty frontier orbital energy of about 1.0 eV to −5 eV.

6. The ink formulation of claim 4, wherein the borate buffer has a $PK_a$ of about 7.5 to about 9.5.

7. The ink formulation of claim 4, wherein the borate buffer has an empty frontier orbital energy of about 1.0 eV to −5 eV.

8. The ink formulation of claim 4, wherein the pigment is in an amount from about 0.1 to 10 weight percent of the pigment ink formulation; and the buffer in an amount from about 0.05 to 8 weight percent of the pigment ink formulation.

9. An ink formulation, comprising:
a pigment; and
a borate buffer, wherein the ink formulation has an ink stability characteristic such that pH of the ink drifts less than 1.0 pH over a one year time period, and wherein the ink formulation has a size stability characteristic such that a diameter of the pigment increases less than 20% over a one year time period, wherein the borate buffer is selected from at least one of: tetramethylammonium borate, triethanolamine borate, diethanolamine borate, ethanolamine borate, and combinations thereof.

10. The ink formulation of claim 9, wherein the ink formulation has an ink stability characteristic such that pH of the ink drifts less than 0.5 pH over a one year time period.

11. The ink formulation of claim 9, wherein the ink formulation has an ink stability characteristic such that pH of the ink drifts less than 0.2 pH over a one year time period.

12. The ink formulation of claim 9, wherein the ink formulation has an ink stability characteristic such that pH of the ink drifts less than 1.0 pH over a one and a half year time period, and wherein the size stability characteristic has the diameter of the pigment increasing less than 20% over a one and a half year time period.

13. The ink formulation of claim 9, wherein the ink formulation has an ink stability characteristic such that pH of the ink drifts less than 1.0 pH over a two year time period, and wherein the size stability characteristic has the diameter of the pigment increasing less than 20% over a two year time period.

* * * * *

UNITED STATES PATENT AND TRADEMARK OFFICE
CERTIFICATE OF CORRECTION

PATENT NO. : 7,300,506 B2  Page 1 of 1
APPLICATION NO. : 11/082680
DATED : November 27, 2007
INVENTOR(S) : Sundar Vasudevan It is certified that error appears in the above-identified patent and that said Letters Patent is hereby corrected as shown below:

In column 9, line 9, in Claim 6, delete "$PK_a$," and insert -- $pK_a$ --, therefor.

Signed and Sealed this

Twentieth Day of April, 2010

David J. Kappos
*Director of the United States Patent and Trademark Office*